April 10, 1951  A. N. GOLDSMITH  2,548,783
COLOR FACSIMILE SCANNING DEVICE
Filed Oct. 28, 1949
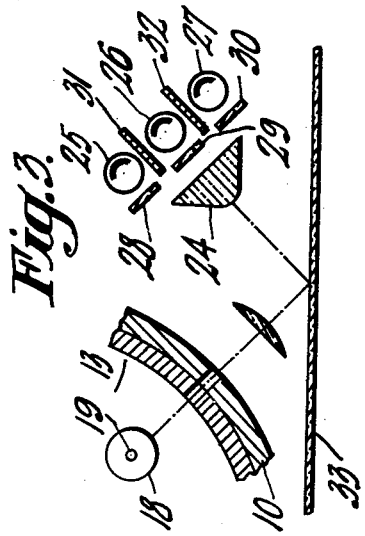
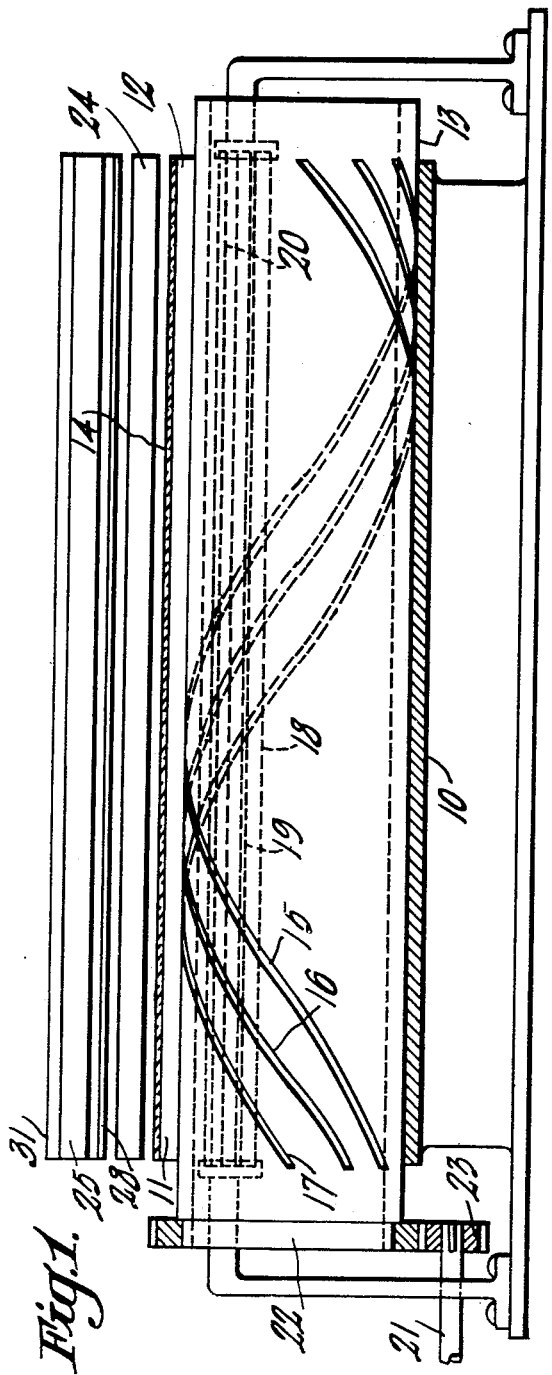
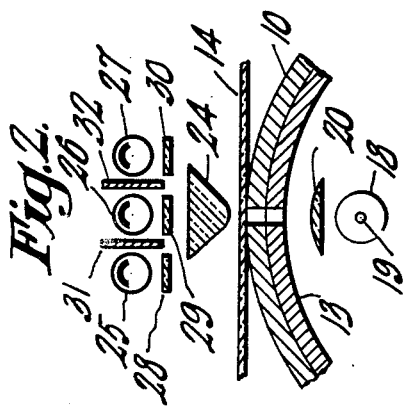
INVENTOR
Alfred N. Goldsmith
ATTORNEY Patented Apr. 10, 1951

2,548,783

UNITED STATES PATENT OFFICE 2,548,783

COLOR FACSIMILE SCANNING DEVICE

Alfred N. Goldsmith, New York, N. Y., assignor to Radio Corporation of America, a corporation of Delaware Application October 28, 1949, Serial No. 124,000

2 Claims. (Cl. 178—5.2)

This invention relates to color facsimile scanning devices, and has for its principal object the provision of an improved facsimile scanning device and method of operation which are useful in the transmission or reception of color facsimile subject matter recorded on either a transparent or an opaque recording medium.

The method of scanning involved in the operation of the device of the present invention is hereinafter designated as a simultaneous-sequential method of scanning. This method involves (1) simultaneously scanning an appreciable area of the colored subject matter and (2) sequentially scanning the primary or component colors of the subject matter at extremely brief intervals within the period of a single scanning line.

One form of scanning device suitable for carrying this simultaneous-sequential method of scanning into effect includes a cylinder which is provided with a different helical slit for each primary color of the subject matter and is arranged to be rotated within a fixed cylinder having a longitudinal light slit which has a width equal to or slightly less than a scanning element. Thus, in the case of three primary colors, there are three helical slits displaced by a fraction of the circumference of the rotatable cylinder and each of these helical slits has one turn for the effective length of the scanning line.

Within the rotatable inner cylinder, and in alignment with the longitudinal slit of the fixed outer cylinder, is mounted a linear or cylindrical source of white light. Each helical slit of the rotatable cylinder is covered with a filter adapted to pass only light of a different one of the primary colors of the subject matter. Under these conditions, rotation of the inner cylinder is effective to produce a series of light beams, each of which is of a different color and all of which move along the scanning line determined by the longitudinal slit of the fixed cylinder.

If color facsimile subject matter recorded on a transparent record medium is to be transmitted, such record medium is moved over the fixed cylinder in a direction at right angles to its longitudinal slit and the differently colored light beams are projected through this record medium, a suitable lens and different filters to different photocells, a suitable relation being maintained between the rotational speed of the rotatable cylinder and the speed at which the record medium is moved. Thus color-separation light beams pass through the record medium, one scanning line is covered for each revolution of the inner cylinder and the color filters in the helical slits and those covering the different photocells function to provide at the outputs of the photocells color-separation signals which may be transmitted in a manner conventional in the art.

If color facsimile subject matter is to be recorded on a transparent record medium, (1) the record medium or color film is moved as indicated above with its sensitive surface adjacent the slit of the fixed outer cylinder, (2) the lamp within the rotatable inner cylinder is replaced by three geometrically similar primary-color light sources respectively modulated by the incoming color separation signals, and (3) the photocells together with the associated filters and lenses are not utilized or are omitted.

If color facsimile subject matter, recorded on an opaque record medium, is to be transmitted, the differently colored light beams are focused at the record surface from which they are reflected through a suitable lens and differently colored filters to photocells which are arranged as previously described.

If color facsimile subject matter is to be recorded on an opaque record medium, (1) the lamp within the rotatable inner cylinder is replaced by three geometrically similar primary-color light sources respectively modulated by the incoming color-separation signals and (2) the photocells together with their associated filters and lens are not utilized or are omitted.

It is preferred, in all modifications of the invention, that the photocells each be selective to the color of the particular light beam applied to it. From what has been said, it is apparent that the present invention involves an assemblage of scanning means and a method of scanning which are utilized irrespective of whether the color facsimile subject matter is transmitted or received or of whether the record medium is transparent or opaque. Thus there is common to all modifications of the invention (1) an outer fixed cylinder having a longitudinal slit for defining a scanning line, (2) an inner rotatable cylinder having helical slits each covered by a filter of a different component-color, (3) a record medium to be moved transversely of the longitudinal slit of the fixed outer cylinder, and (4) means for correlating the movement of the record medium and the rotation of the inner cylinder so that the light beams of different component-colors follow one another at spaced intervals along each scanned line of the subject matter.

The invention will be better understood from the following description, considered in connection with the accompanying drawings, and its scope is indicated by the appended claims.

Referring to the drawings:

Figure 1 is a side view (shown partly in cross-section) of the improved scanning device of the present invention, Figure 2 is a sectional view showing the relation between the various parts of the scanning device as adapted to the transmission of color television subject matter from a transparent record medium, and Figure 3 is a similar sectional view showing the scanning device as adapted to the transmission of color television subject matter from an opaque record medium.

Figures 1 and 2 show a device suitable for the transmission of transparent subject matter such as a color transparency. This device includes an outer fixed cylinder 10 which has a slit 11—12 parallel to its axis and is cut away to show an inner rotatable cylinder 13. A color transparency 14 bearing the subject matter is moved transversely of the slit 11—12 which has a width equal to or slightly less than a picture element.

The inner rotatable cylinder 13 has three helical slits 15, 16 and 17 which (1) are spaced from one another longitudinally of the rotatable cylinder, (2) have a width equal to or less than a picture element, (3) have one turn for the length of the scanning line determined by the longitudinal slit of the fixed cylinder 10 and (4) have within or over them filters each of which transmits light having a color of a different primary color of the subject matter of the transparency 14. Thus the interaction of the fixed and rotatable cylinders is such as to form differently colored light apertures which are spaced from one another and move from one end of the scanning line to the other.

Mounted within the inner cylinder 13 and directly below the slit 11—12 of the fixed cylinder 10 is a light source 18 including, for example, a long filament 19 which emits substantially white light. This light may be focused at the outer portion of the slit 11—12 either by a long cylindrical lens 20, or by a cylindrical mirror (not shown) mounted below the lamp 18 with its axis parallel to that of the filament 19, or by both a cylindrical lens and a cylindrical mirror. Under these conditions, rotation of the inner cylinder 13 is effective to produce three differently colored light beams which are spaced apart and move from one end of the scanning line to the other.

The transparency to be scanned passes over the slit 11—12 in a direction perpendicular thereto and at a speed such that the transparency moves forward by a distance equal to substantially one scanning line for each revolution of the inner cylinder 13. Means for maintaining the desired relation between the speeds of the inner cylinder 13 and the transparency 14 are conventional in the art and may assume any suitable form such as one or more rollers geared to the shaft 21 which is coupled to the cylinder 13 through gears 22 and 23.

A long cylindrical lens 24 spreads the differently colored light beams (passing through the scanning line on the transparency 14) to three photocells 25, 26 and 27 which have long photosensitive surfaces parallel to the axes of the lenses 20 and 24. The photocells 25, 26 and 27 preferably are color selective and have associated with them color filters 28, 29 and 30 which are so disposed that each photocell receives only light transmitted through its corresponding primary-color filter. Opaque baffles 31 and 32 are interposed between the photocells for luminously isolating each from the others. The outputs of the photocells constitute the color separation signal which is transmitted by transmitting means well known to those skilled in the art.

As previously indicated, the scanning device of Figures 1 and 2 is readily converted to a device suitable for recording color facsimile subject matter on a transparency. Such conversion requires only that the lamp 18 be replaced by three geometrically similar primary-color light sources (not shown) which are modulated respectively by the different incoming color separation signals.

Figure 3 shows the scanning device as modified for use in the transmission of color facsimile subject matter from an opaque record medium 33. Such modification involves mounting the cylinders 13 and 14 and the light source 18 on the same side of the record medium 33 as the photocells 25, 26 and 27 so that light is reflected from the record medium through the lens 24 and filters 28, 29 and 30 to the respective photocells. In this case, a long cylindrical lens 34 focuses the differently colored light beams at the scanning line on the subject matter, and the record medium 33 is moved transversely of the scanning line as previously indicated.

The device of Figure 3 is readily converted to a receiver or recorder of color facsimile subject matter by substituting for the lamp 18 three geometrically similar primary color light sources as indicated in connection with Figures 1 and 2.

What the invention provides is a simultaneous-sequential scanning device and method of operation which are readily adapted to the transmission or reception of color facsimile subject matter irrespective of whether such subject matter (1) is to be transmitted from or recorded on a transparency or (2) is to be transmitted from or recorded on an opaque medium.

What is claimed is:

1. Color facsimile scanning apparatus comprising a fixed cylinder having a longitudinal slit, a cylinder rotatable within said fixed cylinder and having a plurality of helical slits, differently colored light filters each covering a different one of said helical slits, a source of light mounted within said rotatable cylinder, means for concentrating light from said source at said longitudinal slit, and means including a plurality of photo-sensitive elements positioned with respect to said slit so that each responds to light transmitted through said longitudinal slit and a different one of said helical slits.

2. Color facsimile scanning apparatus comprising a fixed cylinder having a longitudinal slit, a cylinder rotatable within said fixed cylinder and having a plurality of helical slits, differently colored light filters each covering a different one of said helical slits, a source of light mounted within said rotatable cylinder, means for concentrating light from said source at said longitudinal slit, and means including a plurality of photo-sensitive elements positioned with respect to said slit so that they each respond to light transmitted through a different one of said helical slits.

ALFRED N. GOLDSMITH.

REFERENCES CITED

The following references are of record in the file of this patent:

UNITED STATES PATENTS

| Number | Name | Date |
|---|---|---|
| 1,854,315 | Schmook | Apr. 19, 1932 |

FOREIGN PATENTS

| Number | Country | Date |
|---|---|---|
| 368,620 | Great Britain | Mar. 10, 1932 |